United States Patent
Amano et al.

(10) Patent No.: US 7,044,098 B2
(45) Date of Patent: May 16, 2006

(54) GASKET FOR WATER-COOLED ENGINE FOR OUTBOARD MOTOR

(75) Inventors: Akira Amano, Saitama (JP); Kazuyoshi Sato, Saitama (JP); Yutaka Kubota, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/071,392

(22) Filed: Mar. 3, 2005

(65) Prior Publication Data

US 2005/0215134 A1    Sep. 29, 2005

(30) Foreign Application Priority Data

Mar. 24, 2004 (JP) .............................. 2004-087868

(51) Int. Cl.
*F02F 11/00* (2006.01)
(52) U.S. Cl. .................................. 123/195 R; 277/591
(58) Field of Classification Search ............ 123/195 R; 277/590–599
See application file for complete search history.

(56) References Cited

U.S. PATENT DOCUMENTS 5,374,069 A * 12/1994 Pecina ........................ 277/592

FOREIGN PATENT DOCUMENTS

| JP | 01203763 A | * | 8/1989 |
| JP | 02196647 A | * | 8/1990 |
| JP | 06-011042 | | 1/1994 |

* cited by examiner

*Primary Examiner*—Henry C. Yuen
*Assistant Examiner*—Hyder Ali
(74) *Attorney, Agent, or Firm*—Carrier, Blackman & Associates, P.C.; Joseph P. Carrier; William D. Blackman

(57) ABSTRACT

Gaskets are placed in joints between adjacent nonferrous metal engine members of a water-cooled engine for an outboard motor, such as a cylinder block, a cylinder head, a crankcase, a mount case and an oil pan, to seal the joints. Each of the gaskets has a base member formed of a stainless steel. The surfaces of the base member are coated with electrochemical corrosion preventing films formed by applying a liquid containing flakes of an aluminum alloy or a zinc alloy and a silicate resin in films and baking the films of the liquid. The electrochemical corrosion preventing films are coated with sealing films formed by applying a liquid containing aluminum flakes and a silicate resin to the electrochemical corrosion preventing films and baking the films of the liquid. The gaskets are prevented from electrochemically corroding despite potential difference between each gasket and the adjacent engine members.

12 Claims, 7 Drawing Sheets

GASKET FOR WATER-COOLED ENGINE FOR OUTBOARD MOTOR

BACKGROUND OF THE INVENTION

1. Field of the Invention

The present invention relates to an outboard motor used to propel a boat and capable of being detachably clamped to the transom of the boat and, more particularly, to a gasket for such an outboard motor.

2. Description of the Related Art

An outboard motor includes a case assembly held by a bracket on the hull of a boat, an engine cover detachably attached to the upper end of the case assembly, and an engine disposed in an engine room defined by the case assembly and the engine cover. A vertical member having a cross section defined by a substantially wing-shaped outline is extended vertically downward from a part, corresponding to the engine room, of the case assembly. A vertical drive shaft connected to the output shaft of the engine is extended in the vertical member. A horizontal propeller shaft parallel to a propelling direction is interlocked with a lower part of the drive shaft. A propeller is mounted on the propeller shaft.

The engine of the outboard motor is a vertical-axis engine having a vertical crankshaft. A multicylinder engine for an outboard motor has cylinders placed in vertical arrangement with their axes extended in a horizontal direction parallel to a propelling direction.

An engine has a cylinder block provided with a cylinder or cylinders, and a cylinder head joined to the cylinder block so as to define a combustion chamber or combustion chambers. Generally, low-power outboard motors, for propelling a boat, having a small power capacity on the order of 2 PS, are provided with an air-cooled engine and those having a large power capacity are provided with a water-cooled engine. The outboard motor provided with a water-cooled engine pumps up water through a submerged part thereof by a cooling water pump and sends the water through a water passage toward the water-cooled engine. The water flows through a water jacket formed in the cylinder block and the cylinder head so as to surround the cylinders forming combustion chambers to cool the cylinder block and the cylinder head, flows down into a lower part of the outboard motor and is discharged from the outboard motor.

When the engine is a four-stroke engine, the engine is provided with an oil pan for holding lubricating oil for lubricating parts of the engine.

A gasket is held between the cylinder block and the cylinder head to make a pressure-tight joint for preventing the leakage of the combustion gas. Gaskets are held also between the cylinder block and a mount case included in the case assembly and between the mount case and the oil pan, respectively, to prevent the leakage of the lubricating oil. Those gaskets are provided with openings corresponding to openings of the cooling water passage and the edges of those gaskets are exposed to the mist of cooling water containing the exhaust gas.

Generally, the gaskets are formed of a stainless steel, while engine parts including the cylinder block, the cylinder head and the oil pan are formed of aluminum alloys to form the engine in a lightweight structure. Consequently, the gaskets and the engine parts are corroded by electrochemical corrosion due to potential difference between each gasket and an engine part continuous with the gasket.

An aluminum-core cylinder head gasket is disclosed in, for example, JP 6-11042 A as a corrosion preventing means for preventing the electrochemical corrosion of the engine parts of the outboard motor. This known cylinder head gasket has a core formed by working a metal sheet having an electrolytic potential approximately equal to that of the surfaces of first and second engine parts of a nonferrous metal of a water-cooled engine, and having upper and lower surfaces, and a coating having first and second layers respectively coating the upper and the lower surface of the core.

More concretely, the cylinder head and the cylinder block are formed by casting aluminum and are joined together with bolts. The gasket is held between the cylinder head and the cylinder block. The gasket has an aluminum core, first and second coating layers on the aluminum core, made of heat-resistant aramid fibers or a synthetic elastomer capable of making a water-tight joint, and a sealing member of a stainless steel for providing a seal around the combustion chamber. The gasket is provided with openings corresponding to openings of the cooling water passage. The aluminum core is sandwiched between the first and second coating layers to make the potential of the gasket equal to that of the engine part, such as the cylinder block.

The known gasket is complicated in construction, is difficult to manufacture and hence is expensive. Moreover, the aluminum core of the gasket is subject to electrochemical corrosion.

The present invention has been made to solve those problems and it is therefore an object of the present invention to provide a gasket including a gasket base formed of a ferrous metal and coating members formed of a nonferrous metal and respectively coating surfaces of the gasket base, resistant to electrochemical corrosion and capable of ensuring reliable sealing and to provide a water-cooled engine provided with the foregoing gasket.

SUMMARY OF THE INVENTION

According to a first aspect of the present invention there is provided a gasket, for a water-cooled engine having a crankshaft and a camshaft, included in an outboard motor and installed with the crankshaft and the camshaft vertically extending in an engine room formed by detachably attaching an engine cover to an upper end of a case assembly capable of being held by a bracket on a hull of a boat, the gasket being held between two adjacent ones of engine parts formed of nonferrous metals and selected from the group consisting essentially of a cylinder block, a cylinder head, a crankcase, a mount case and an oil pan to make a pressure-tight joint between the adjacent engine parts: the gasket comprising: a gasket base formed of a ferrous metal; electrochemical corrosion preventing films respectively coating surfaces of the gasket base; and sealing films respectively coating the electrochemical corrosion preventing films.

Typically, the nonferrous metals are aluminum alloys and the ferrous metal is a stainless steel.

The electrochemical corrosion preventing films may contain an aluminum alloy or a zinc alloy.

The electrochemical corrosion preventing films may contain a silicate resin.

The sealing films may contain an aluminum alloy.

The sealing films may contain a silicate resin.

A water-cooled engine according to a second aspect of the present invention includes: engine parts formed of a nonferrous metal and including a cylinder block, a cylinder head, a crankcase, a mount case and an oil pan; and a gasket held between two adjacent ones of the engine parts to make a pressure-tight joint between the adjacent engine parts; wherein the gasket includes: a gasket base formed of a ferrous metal; electrochemical corrosion preventing films respectively coating the surfaces of the gasket base; and sealing films respectively coating the electrochemical corrosion preventing films.

The gasket of the present invention, which can be used for making a pressure-tight joint between the two adjacent engine parts of the water-cooled engine for an outboard motor, includes the gasket base formed of a ferrous metal, the electrochemical corrosion preventing film coating the surface of the gasket base, and the sealing film coating the surface of the electrochemical corrosion preventing film. Even though the gasket base is formed of a ferrous metal and the engine parts on the opposite sides of the gasket are formed of a nonferrous metal, the gasket base is prevented from electrochemically corroding and the gasket makes a reliable pressure-tight joint between the engine parts.

The invention can be applied to a water-cooled engine for an outboard motor having engine parts formed of generally used materials provided that the nonferrous metal is an aluminum alloy and the ferrous metal is a stainless steel.

When the electrolytic corrosion preventing film contains an aluminum alloy or a zinc alloy, the zinc alloy or the aluminum alloy serves as an anode instead of iron and as a sacrificial metal to prevent the electrochemical corrosion of iron-base members.

When the electrochemical corrosion preventing film containing a silicate resin is exposed to water, oxygen or an electrolytic material, a basic substance or a chloride of zinc or aluminum is produced due to corrosion, those corrosion-produced materials seal pinholes and exercise a chemical corrosion preventing effect to prevent iron-rusting matters from penetrating the electrochemical corrosion preventing film.

When the sealing film contains an aluminum alloy and a silicate resin, several tens of aluminum alloy flake layers are formed on the electrochemical corrosion preventing film so as to coat the electrochemical corrosion preventing film to prevent external rusting matters from penetrating the electrochemical corrosion preventing film and suppress the formation of white zinc oxide. The aluminum alloy flakes enhances the scratch resistance and the strength of the electrochemical corrosion preventing film and suppress the pitting corrosion of the aluminum alloy engine part in contact with the electrochemical corrosion preventing film.

DESCRIPTION OF THE PREFERRED EMBODIMENTS

Figure 1:
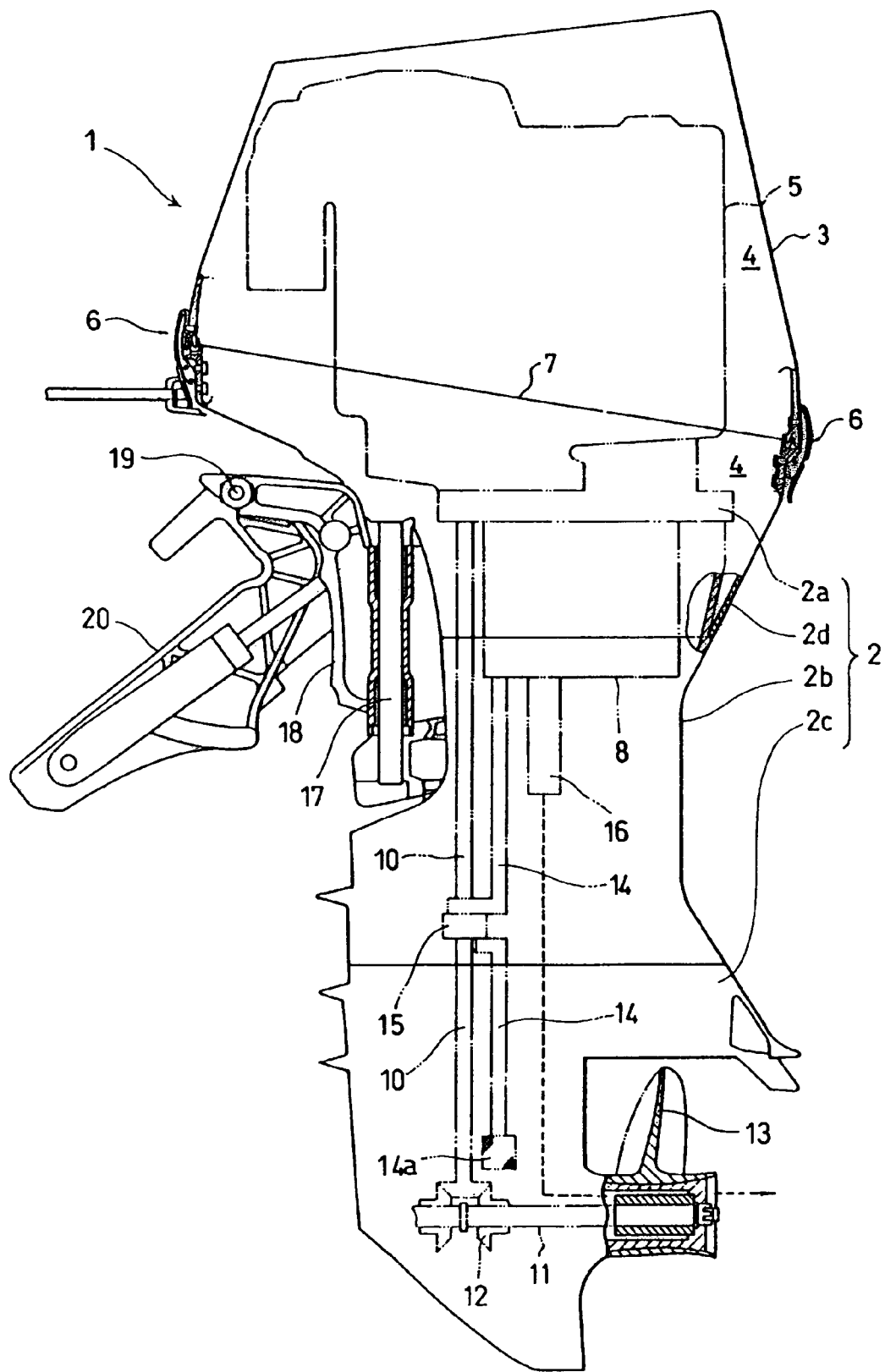
FIG. 1 is a side elevational view of an outboard motor including a water-cooled engine in a preferred embodiment of the present invention.

FIG. 1 shows an outboard motor 1 provided with a water-cooled engine 5 in a preferred embodiment of the present invention in a side elevation. The outboard motor 1 is clamped to the transom of a boat. In FIG. 1, the front side of the outboard motor 1 is on the left side, i.e., on the side of the transom of the boat. The outboard motor 1 has a case assembly 2, an engine cover 3 covering the open upper end of the case assembly 2, and the water-cooled engine 5. The water-cooled engine 5 is installed in an engine room 4 defined by an upper part of the case assembly 2 and the engine cover 3.

The case assembly 2 is built by assembling a mount case 2a, an extension case 2b joined to the lower end of the mount case 2a, a gear case 2c joined to the lower end of the extension case 2b, and a lower cover 2d surrounding an upper part of the extension case 2b and the mount case 2a. Front and back parts of the engine cover 3 are detachably fixed to the lower cover 2d of the case assembly 2 by fasteners 6 with the lower edge thereof closely joined to the upper edge 7 of the lower cover 2d.

Figure 2:
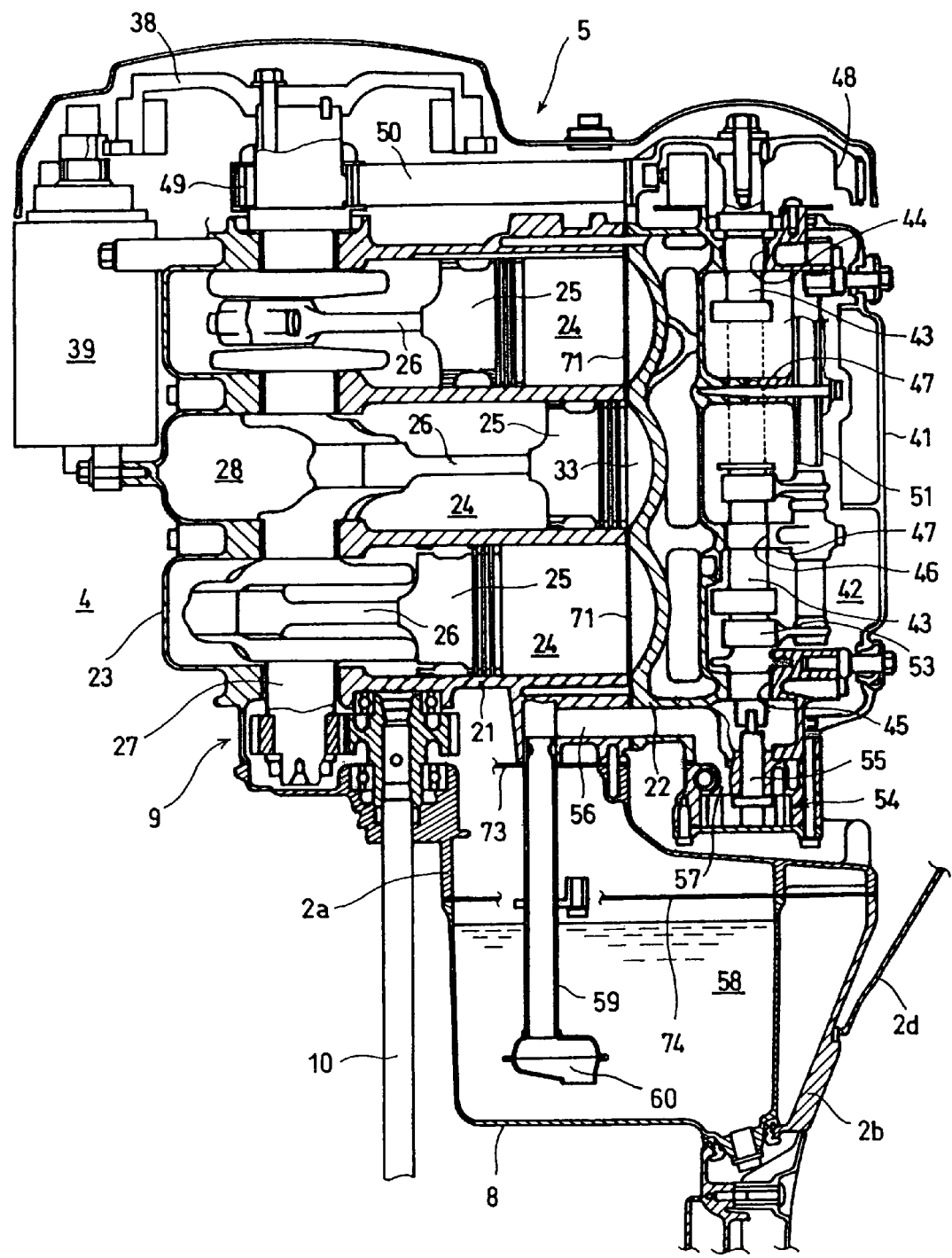
FIG. 2 is a longitudinal sectional view of the water-cooled engine shown in FIG. 1.

The water-cooled engine 5 is attached to the mount case 2a of the case assembly 2. An oil pan 8 is joined to the lower end of the mount case 2a so as to protrude downward. The water-cooled engine 5 is disposed with its crankshaft extended vertically. A drive shaft 10 is interlocked with the crankshaft by a gear transmission. As shown in FIGS. 1 and 2, the drive shaft 10 extending downward from the mount case 2a extends through interior spaces of the extension case 2b and the gear case 2c of the case assembly 2. A propeller shaft 11 extending horizontally backward is interlocked with the lower end of the drive shaft 10 by a bevel gear mechanism 12. A propeller 13 is fixedly mounted in a back end part of the propeller shaft 11. A cooling water pump 15 pumps up water from a lower part of the gear case 2c and sends the water as cooling water through an intake pipe 14 into the water-cooled engine 5. The intake pipe 14 is provided at its lower end with a filter 14a.

The exhaust gas flows downward through an exhaust pipe 16 included in the water-cooled engine 5 as indicated by dotted lines in FIG. 1 and is discharged backward through bores formed in the boss of the propeller 13 into water. The used cooling water is discharged backward also through the bores formed in the propeller 13 into water.

A swivel case 18 is pivotally supported on a front part of the mount case 2a of the case assembly 2 by a swivel shaft 17. A front end part of the swivel case 18 is pivotally joined to a stern bracket 20 by a tilting shaft 19. The outboard motor 1 held by the stern bracket 20 on the boat is able to turn in a horizontal plane on the swivel shaft 17 and is able to turn in a vertical plane about the tilting shaft 19.

Figure 3:
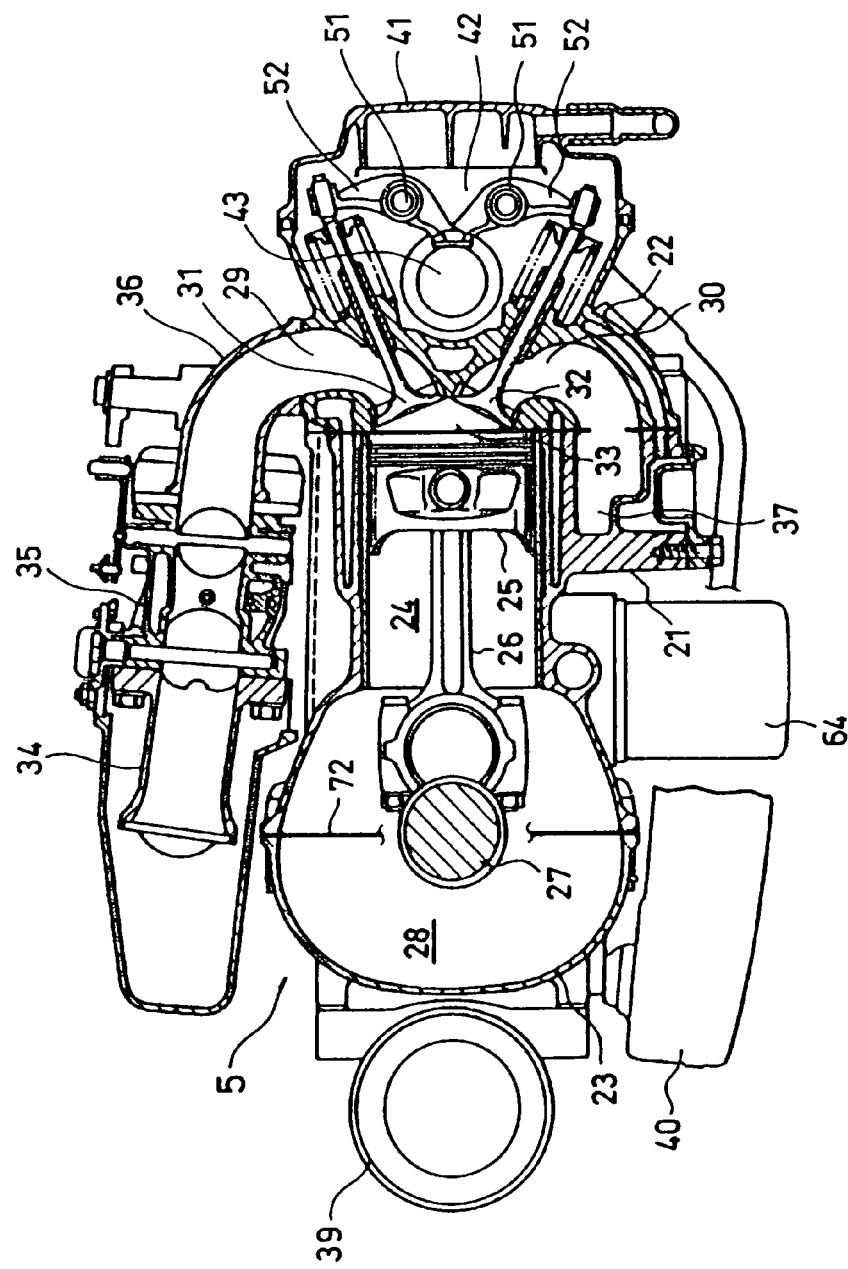
FIG. 3 is a cross-sectional view taken in a horizontal plane of the water-cooled engine shown in FIG. 1.

FIG. 2 is a longitudinal sectional view of the water-cooled engine 5 and FIG. 3 is a cross-sectional view taken in a horizontal plane of the water-cooled engine 5. The water-cooled engine 5 is a four-stroke three-cylinder engine. The water-cooled engine 5 has a body including a cylinder block 21, a cylinder head 22 and a crankcase 23. The water-cooled engine 5 is installed in the engine room 4 with the crankcase 23 disposed on the front side and the cylinder head 22 disposed on the back side. The cylinder block 21 is provided with three horizontal cylinders 24 arranged in a vertical arrangement. Pistons 25 fitted in the cylinders 24 are connected to the crankshaft 27 by connecting rods 26, respectively. The crankshaft 27 is disposed in a vertical position in a crank chamber 28 defined by the cylinder block 21 and the crankcase 23. The lower end of the crank chamber 28 opens into the oil pan 8.

Referring to FIG. 3, cylinder head 22 is provided with an intake port 29 on the starboard side and an exhaust port 30 on the port side for each cylinder 24. The intake port 29 and the exhaust port 30 are opened and closed by an intake valve 31 and an exhaust valve 32, respectively. An air intake system including an intake pipe 34, a carburetor 35 and a suction pipe 36 is disposed on the starboard side of the engine unit of the water-cooled engine 5. The suction pipe 36 is connected to the intake port 29. A vertical exhaust passage 37 is formed along a back part of the left side surface of the cylinder block 21. Each exhaust port 3 opens into the exhaust passage 37. The exhaust pipe 16 is connected to the exhaust passage 37.

Referring to FIG. 2, a generator 38 is mounted on top of a front part of the upper end of the engine unit. The generator 38 is driven by the crankshaft 27 to charge a battery. A starting motor 39 is attached to the front surface of the crankcase 23. The battery supplies power to the starting motor 39. In FIG. 3, indicated at 40 is an electric equipment box.

A camshaft 43 is disposed vertically in a camshaft chamber 42 defined by the cylinder head 22 and a cylinder head cover 41. As shown in FIG. 2, the upper and lower ends of the camshaft 43 are supported by an upper bearing 44 and a lower bearing 45, respectively, on the cylinder head 22. Middle parts of the camshaft 43 are supported by middle bearings 46 on support walls 47 formed integrally with the cylinder head 22.

A driven pulley 48 is mounted on the upper end of the camshaft 43, a drive pulley 49 is mounted on the upper end of the crankshaft 27, and a belt 50 (FIG. 2) is extended between the drive pulley 49 and the driven pulley 48 to drive the camshaft 43 by the crankshaft 27. Two rocker shafts 51 are extended parallel to the camshaft 43 and rocker levers 52 are supported pivotally on the rocker shafts 51. The rocker levers 52 are driven for rocking motions by cams 53 formed on the camshaft 43 to operate the intake valves 31 and the exhaust valves 32.

Lubricating oil contained in the oil pan 8 is pumped by a trochoid oil pump 54 for circulation to lubricate sliding parts of the water-cooled engine 5. The lower end of the camshaft 43 is coupled with the rotor shaft 55 of the oil pump 54 to drive the oil pump 54. As shown in FIG. 2, an oil suction passage 56 is formed in a lower part of one of the opposite sides of the engine unit between a back part of the cylinder block 21 and a front part of the cylinder head 22. The oil suction passage 56 has a back end connected to the suction port 57 of the oil pump 54 and a front end connected to the upper end of a vertical oil suction pipe 59. A screen-type oil strainer 60 is attached to the lower end of the oil suction pipe 59.

The oil pump 54 has an outlet port connected to an oil supply passage, not shown. The oil supply passage extends forward parallel to the oil suction passage 56 in a lower part of the other side of the engine unit. The oil supply passage has a front end connected to the lower end of a main oil gallery, not shown, vertically extending through the cylinder block 21 along the vertical arrangement of the cylinders 24. As mentioned above, the management of the lubricating oil is very important for the engine of the outboard motor and fresh lubricating oil must be always supplied to lubricated parts. As shown in FIG. 3, an oil filter 64 is connected to the main oil gallery to clean the lubricating oil before sending the lubricating oil into the main oil gallery.

Most of the component parts of the water-cooled engine 5 are formed of aluminum alloys to build the water-cooled engine 5 in a lightweight structure.

A gasket 71 (FIG. 2) is held between the cylinder block 21 and the cylinder head 22 to prevent the leakage of the combustion gas. A gasket 72 (FIG. 3) is held between the cylinder block 21 and the crankcase 23 to prevent the leakage of the lubricating oil. A gasket 73 (FIG. 2) is held between the cylinder block 21 and the mount case 2a of the case assembly 2 to prevent the leakage of the lubricating oil. A gasket 74 (FIG. 2) is held between the mount case 2a and the oil pan 8 to prevent the leakage of the lubricating oil. The gasket 74 placed on the upper edge of the oil pan 8 will be described by way of example.

Figure 4:
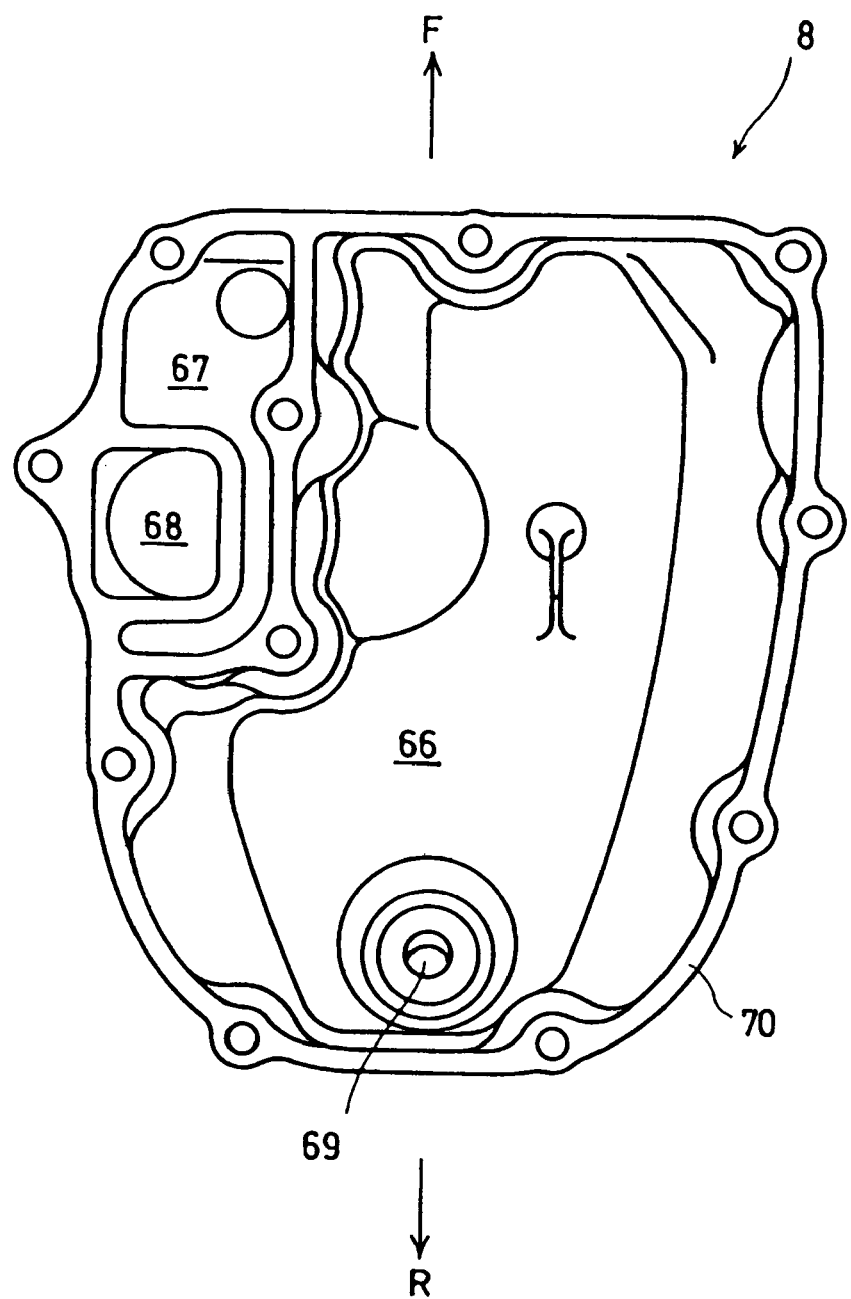
FIG. 4 is a plan view of an oil pan shown in FIG. 2.

FIG. 4 is a plan view of the oil pan 8. In FIG. 4, the arrow F indicates a forward direction and the arrow R indicates a rearward direction. Shown in FIG. 4 are an oil containing part 66, a water passage 67 formed along the outer surface of a side wall of the oil pan 8, a discharge passage 68 formed along the outer surface of the side wall of the oil pan 8, a drain plug 69 and a joining surface 70 on which the gasket 74 is placed.

Figure 5:
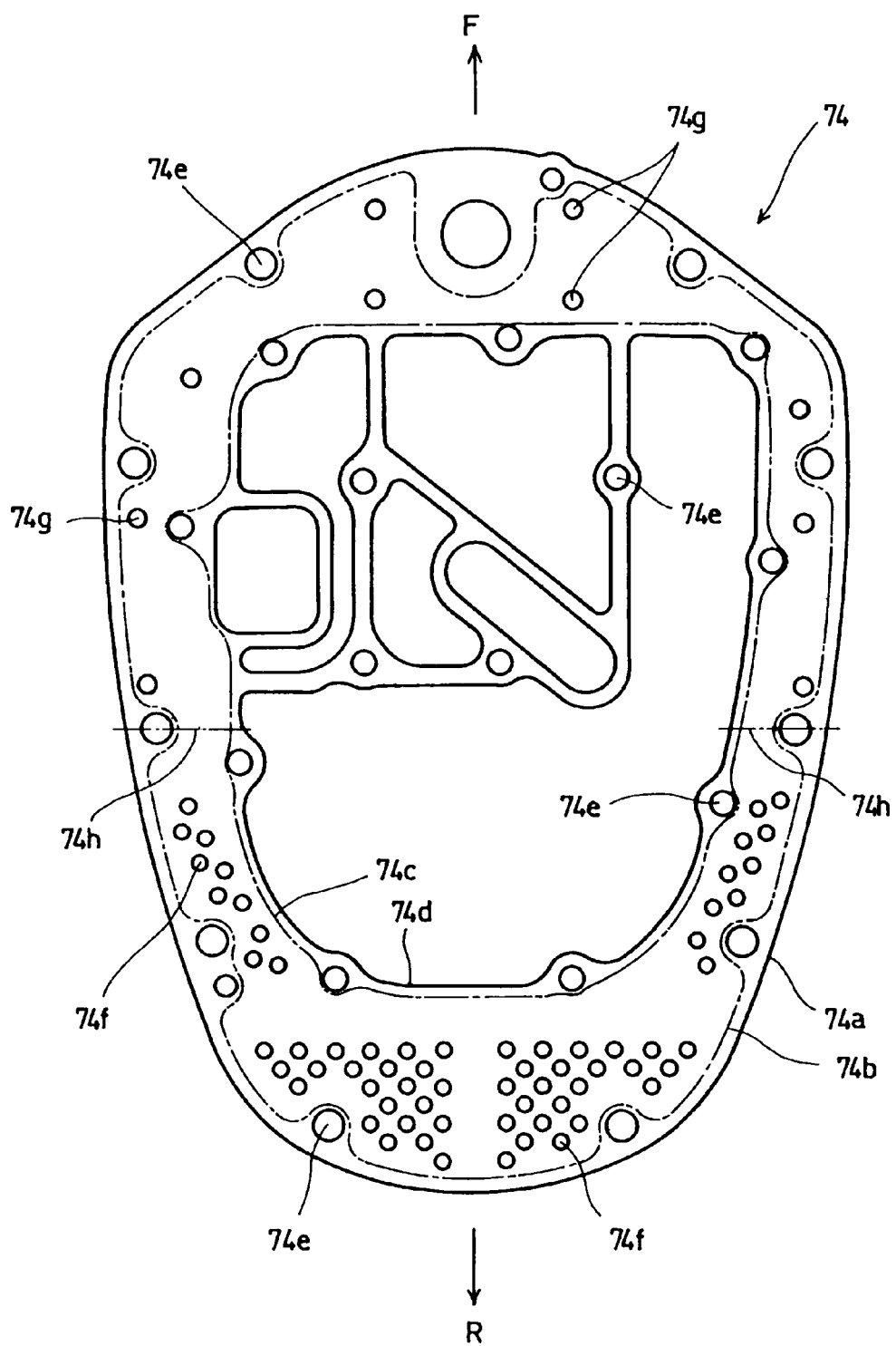
FIG. 5 is a plan view of a gasket to be placed on the upper surface of the oil pan shown in FIG. 4.

Referring to FIG. 5 showing the gasket 74 in plan view, the gasket 74 seals not only the joint of the lower surface of the mount case 2a and the upper surface of the oil pan 8 but also the joint of the lower surface of the mount case 2a and upper surface of the extension case 2b. In FIG. 5, an area between a continuous line 74a indicating the outline of the gasket 74 and a chain line 74b adjacent to the continuous line 74a comes into contact with the upper surface of the extension case 2b. An area between a chain line 74c and a continuous line 74d comes into contact with the upper surface of the oil pan 8.

Shown in FIG. 5 are bolt holes 74e, discharge holes 74f and drain holes 74g. A part, behind a chain line 74h, i.e., a lower part in FIG. 5, of an area between the chain lines 74b and 74c is a discharge area. A part in front of the chain line 74h, i.e., an upper part in FIG. 5, of the area between the chain lines 74b and 74c is a drain area.

Figure 6:
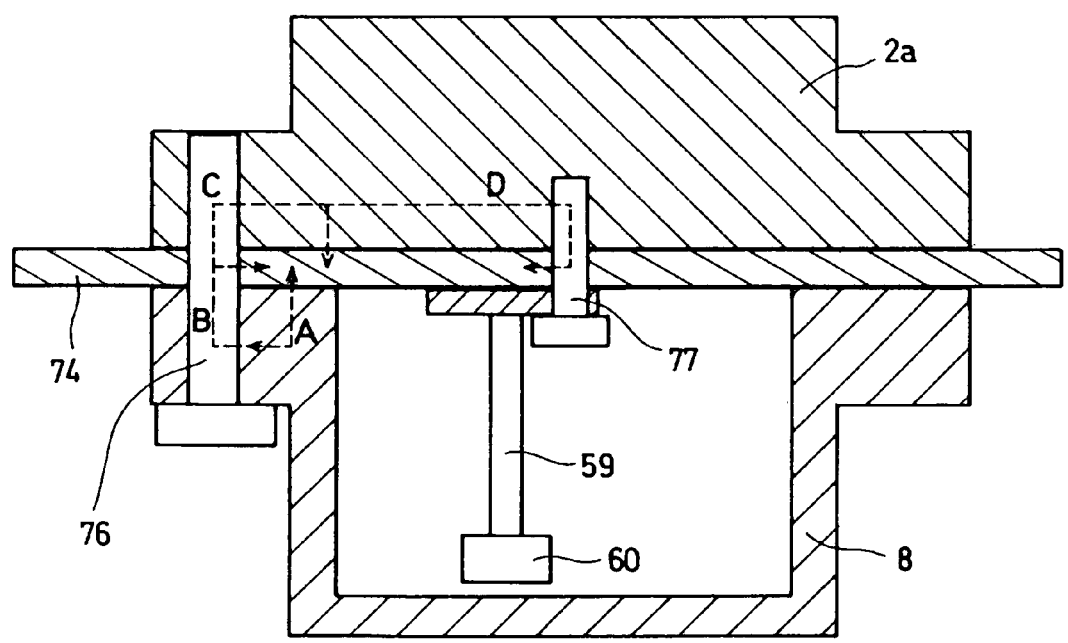
FIG. 6 is a view of assistance in explaining a passage of electric current around a gasket.

The gasket 74 has a base member formed of a stainless steel. The oil pan 8 and the mount case 2a are formed of aluminum alloys, as stated hereinbefore. When the gasket 74 is held between the oil pan 8 and the mount case 2a, a potential difference exists between the gasket 74 and the oil pan 8 and between the gasket 74 and the mount case 2a, and a very low current flows through the gasket 74. FIG. 6 shows electric conduction passages in a typical view. A current flows through a circuit A from the joining surface 70 of the oil pan 8 to the gasket 74, a current flows through a circuit B from the oil pan 8 through a bolt 76 to the gasket 74, a current flows through a circuit C from the oil pan 8 through the bolt 76 and the mount case 2a to the gasket 74, and a current flows through a circuit D from the oil pan 8 through the bolt 76, the mount case 2a and a strainer fastening bolt 77 to the gasket 74. Thus, currents flow through the four circuits A, B, C and D from the oil pan 8 to the gasket 74. If the stainless steel base member of the gasket 74 has untreated surfaces, parts of the untreated surfaces of the gasket 74 in contact with the oil pan 8 and the mount case 2a undergo severe electrochemical corrosion.

Figure 7:
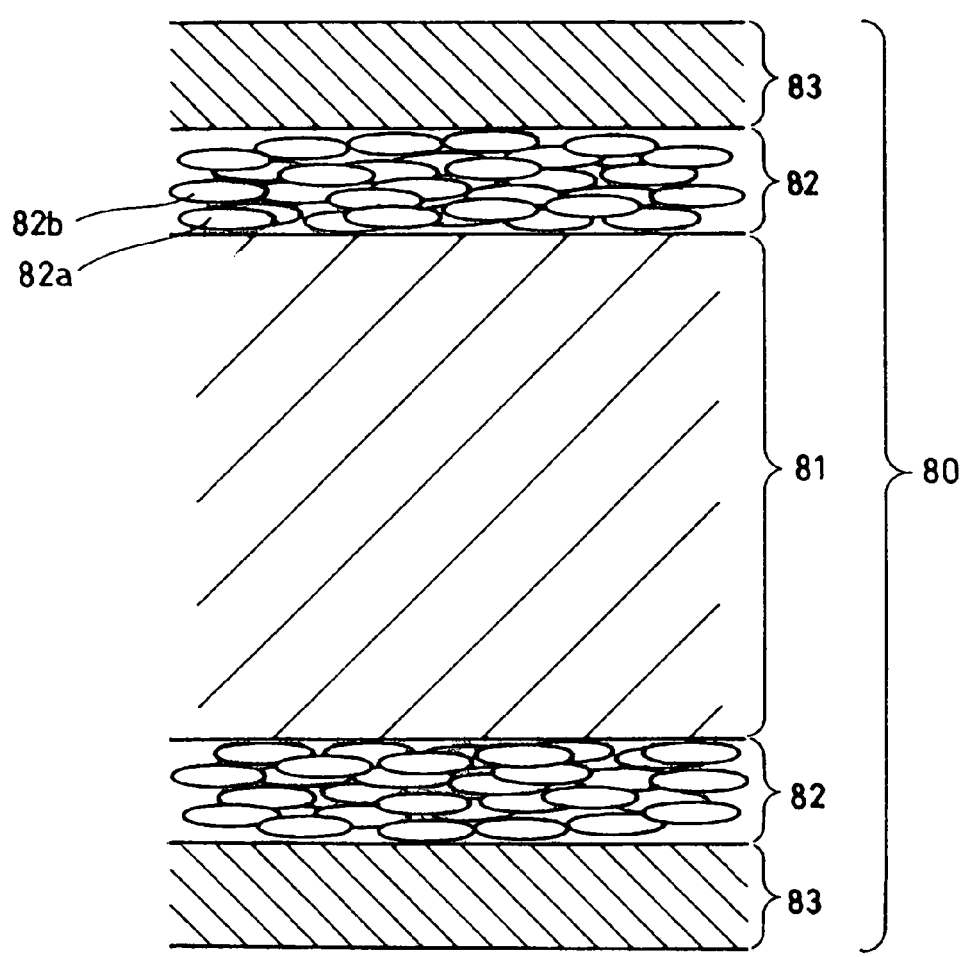
FIG. 7 is a sectional view of a gasket in a preferred embodiment of the present invention.

The surfaces of the base member of the gasket 74 embodying the present invention are coated with electrochemical corrosion preventing films, namely, base coats, respectively, and the electrochemical corrosion preventing films are coated thereon with sealing films, respectively. FIG. 7 is a typical sectional view of a gasket 80 embodying the present invention. As shown in FIG. 7, the gasket 80 has a base member 81 formed of a stainless steel, electrochemical corrosion preventing films 82 respectively coating the surfaces (including the opposite major surfaces and other surfaces) of the base member 81 (including the opposite major surfaces, and sealing films 83 respectively coating the surfaces of the electrochemical corrosion preventing films 82. Thus, the gasket 80 is made up of the base member 81, the electrochemical corrosion preventing films 82 and the sealing films 83.

The electrochemical corrosion preventing films 82, namely, the base coats, are formed, for example, by applying a liquid prepared by dispersing powder of an aluminum alloy or a zinc alloy and powder of a silicate resin in water or a solvent to the surfaces of the base member 81 formed of a stainless steel in films and baking the films of the liquid. The thickness of the electrochemical corrosion preventing films 82 is between about 10 and about 30 μm. The films of the liquid are baked by a primary baking process that bakes the films, for example, at 250° C. for 30 min in a baking furnace and a secondary baking process that bakes the films, for example, at 180° C. for 30 min in a baking furnace.

The electrochemical corrosion preventing films 82 contains active aluminum alloy flakes 82a or active zinc alloy flakes 82b, and a binder material. These flakes 82a or 82b are in integral layers on the surfaces of the base member 81 with the binder material, made of a silicate resin, for example, therebetween. The aluminum alloy flakes 82a or the zinc alloy flakes 82b are higher in ionization tendency than the base member 81 formed of a stainless steel, namely, a ferrous metal. Therefore, the aluminum alloy flakes 82a or the zinc alloy flakes 82b are ionized and exercise their sacrificial corrosion preventing effect to prevent the base member 81 formed of a stainless steel effectively from electrochemical corrosion. The aluminum alloy or the zinc alloy serves as an anode and exercises a sacrificial electrochemical corrosion preventing effect to prevent a member formed of a ferrous material from electrochemical corrosion. A basic substance of aluminum or zinc, and aluminum chloride or zinc chloride are produced by the chemical interaction between the aluminum alloy or the zinc alloy, oxygen and electrolytic substance. Those substances thus produced seal pinholes in the electrochemical corrosion preventing films 82 and exercise a chemical corrosion preventing effect to prevent iron-rusting matters from penetrating the electrochemical corrosion preventing films 82.

The sealing films 83 are formed by applying a liquid prepared by dispersing powder of an aluminum alloy and powder of a silicate resin in water or a solvent to the surfaces of the electrochemical corrosion preventing films 82 coating the base member 81 in films and baking the films of the liquid. The sealing films 83 coating the electrochemical corrosion preventing films 82, namely, base coats, prevent iron-rusting matters from penetrating the electrochemical corrosion preventing films 82 and suppress the formation of white zinc oxide. The sealing films 83 protect the electrochemical corrosion preventing films 82 from scratching, enhance the strength of the electrochemical corrosion preventing films 82 and suppress the electrochemical pitting corrosion of aluminum members in contact with the sealing films 83. The thickness of the sealing films 83 is between about 10 and about 30 μm.

In the gasket 80 (71, 72, 73, 74) embodying the present invention, the surfaces of the base member 81 are coated with the electrochemical corrosion preventing films 82 and the electrochemical corrosion preventing films 82 are coated with the sealing films 83. Therefore, even if the base member 81 of the gasket 80 (71, 72, 73, 74) is formed of a ferrous metal, such as a stainless steel, and members formed of nonferrous materials, such as engine components formed of aluminum alloys, are brought into contact with the surfaces of the gasket 80 (71 72, 73, 74), the gasket 80 (71, 72, 73, 74) does not undergo electrochemical corrosion and maintains its sealing effect.

Although there has been described what is the present embodiment of the invention, it will be understood that variations and modifications may be made thereto without departing from the spirit or scope of the invention, as indicated by the appended claims.

What is claimed is:

1. A gasket, for a water-cooled engine having a crankshaft and a camshaft, included in an outboard motor and installed with the crankshaft and the camshaft vertically extended in an engine room formed by detachably attaching an engine cover to an upper end of a case assembly capable of being held by a bracket on a hull of a boat said gasket being held between two adjacent ones of engine parts formed of nonferrous metals and selected from the group consisting essentially of a cylinder block, a cylinder head, a crankcase, a mount case and an oil pan, to make a pressure-tight joint between the adjacent engine parts, said gasket comprising;
- a gasket base formed of a ferrous metal;
- electrochemical corrosion preventing films respectively coating surfaces of the gasket base; and
- sealing films respectively coating the electrochemical corrosion preventing films;
- wherein the electrochemical corrosion preventing films contain a silicate resin.

2. The gasket for a water-cooled engine according to claim 1, wherein the nonferrous metals are aluminum alloys and the ferrous metal is a stainless steel.

3. The gasket according to claim 2, wherein the electrochemical corrosion preventing films contain at least one of an aluminum alloy, a zinc alloy and a silicate resin, and the sealing films contain one of an aluminum alloy and a silicate resin.

4. The gasket for a water-cooled engine according to claim 1, wherein the electrochemical corrosion preventing films contain at least one of an aluminum alloy and a zinc alloy.

5. The gasket for a water-cooled engine according to claim 1, wherein the sealing films contain an aluminum alloy.

6. The gasket for a water-cooled engine according to claim 1, wherein the sealing films contain a silicate resin.

7. A water-cooled engine comprising:
- engine parts formed of nonferrous metals and including a cylinder block, a cylinder head, a crankcase, a mount case and an oil pan; and
- a gasket held between two adjacent ones of the engine parts to make a pressure-tight joint between the adjacent engine parts;
- wherein the gasket includes:
- a gasket base formed of a ferrous metal;
- electrochemical corrosion preventing films respectively coating surfaces of the gasket base; and
- sealing films respectively coating the electrochemical corrosion preventing films;
- wherein the electrochemical corrosion preventing films contain a silicate resin.

8. The water-cooled engine according to claim 7, wherein the ferrous metal is a stainless steel, and the nonferrous metals are aluminum alloys.

9. The water-cooled engine according to claim 8, wherein the electrochemical corrosion preventing films contain at least one of an aluminum alloy, a zinc alloy and a silicate resin, and the sealing films contain one of an aluminum alloy and a silicate resin.

10. The water-cooled engine according to claim 7, wherein the electrochemical corrosion preventing films contain at least one of an aluminum alloy and a zinc alloy.

11. The water-cooled engine according to claim 7, wherein the sealing films contain an aluminum alloy.

12. The water-cooled engine according to claim 7, wherein the sealing films contain a silicate resin.

* * * * *